(12) United States Patent
Louis et al.

(10) Patent No.: US 6,535,862 B1
(45) Date of Patent: Mar. 18, 2003

(54) METHOD AND CIRCUIT FOR PERFORMING THE INTEGRITY DIAGNOSTIC OF AN ARTIFICIAL NEURAL NETWORK

(75) Inventors: Didier Louis, Fontainebleau (FR); Andre Steimle, Evry (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/411,289

(22) Filed: Oct. 4, 1999

(30) Foreign Application Priority Data

Nov. 26, 1998 (EP) .............................................. 98480083

(51) Int. Cl.$^7$ ................................................. G06N 3/02
(52) U.S. Cl. .............................. 706/26; 706/16; 706/42
(58) Field of Search ............................... 706/26, 16, 42

(56) References Cited

U.S. PATENT DOCUMENTS 5,165,010 A * 11/1992 Masuda et al. ................ 706/42
5,706,400 A * 1/1998 Omlin et al. ................... 706/16

OTHER PUBLICATIONS

Khunasaraphan, C.; Vanapipat, K.; Lursinsap, C., Weight shifting techniques for self–recovery neural networks, Neural Networks, IEEE Transactions on, vol. 5 Issue: 4, Jul. 1994, pp. 651–658.*

Demidenko, S.; Piuri, V., On–line testing in digital neural networks, Test Symposium, 1996., Proceedings of the Fifth Asian, Nov. 20–22, 1996, pp. 295–300.*

Khunasaraphan, C.; Tanprasert, T.; Lursinsap, C., Recovering faulty self–organizing neural networks: by weight shifting technique, Neural Networks, 1994. IEEE World Congress on Computational Intelligence., 1994 IEEE International Conference on, vol. 3.*

* cited by examiner

Primary Examiner—Wilbert L. Starks, Jr.
(74) Attorney, Agent, or Firm—H. Daniel Schnurmann

(57) ABSTRACT

A diagnostic method engages all the neurons of an artificial neural network (ANN) based on mapping an input space defined by vector components based on category, context, and actual field of influence (AIF). The method includes the steps loading the components of a first and second input vectors into the ANN; engaging all the neurons of a same prototype; having all the neurons compute their own distance between the respective prototypes and the second input vector (which should be the same if the neurons were good); determining the minimum distance Dmin and comparing Dmin with a distance D measured between the first and the second input vectors. If Dmin<D, it is indicative that at least one failing neuron exists (i.e., either the distance, the category or the AIF value differs from a predetermined expected value), in which case the failing neuron is isolated. If Dmin≧D, the good neurons of the ANN are deselected, preventing the good neurons from further learning/recognition processing; and repeating the previous steps until the ANN is empty. The present method provides a fast and inexpensive integrity diagnostic of the neurons forming an ANN at the cost of only a few logic gates.

7 Claims, 3 Drawing Sheets

METHOD AND CIRCUIT FOR PERFORMING THE INTEGRITY DIAGNOSTIC OF AN ARTIFICIAL NEURAL NETWORK

FIELD OF INVENTION

The present invention relates, generally, to artificial neural networks and, more particularly, to a method and circuit for performing a diagnostic which guarantees the integrity of the neurons forming the artificial neural network.

BACKGROUND OF INVENTION

Artificial neural networks (ANNs) are used with increased frequency in applications where no mathematical algorithm can describe the problem to be solved. Moreover, they have proven to be highly successful in classifying and recognizing objects. ANNs give excellent results in such cases because of their ability to learn by example and their proficiency of generalizing in order to respond to an input vector that was never introduced before. Thus far, most ANNs have been implemented in software and only a few in hardware.

Several neurons and artificial neural network architectures implemented in semiconductor chips are described in the following related patents:

U.S. Pat. No. 5,621,863 "Neuron Circuit", issued on Apr. 15, 1997 to Boulet et al.;

U.S. Pat. No. 5,701,397 "Circuit for Pre-charging a Free Neuron Circuit", issued on Dec. 23, 1997 to Steimle, et al.;

U.S. Pat. No. 5,710,869 "Daisy Chain Circuit for Serial Connection of Neuron Circuits", issued on Jan. 20, 1998 to Godefroy, et al.;

U.S. Pat. No. 5,717,832 "Neural Semiconductor Chip and Neural Networks Incorporated Therein", issued on Feb. 18, 1998 to Boulet, et al.; and U.S. Pat. No. 5,740,326 "Circuit for Searching/Sorting Data in Neural Networks", issued on Apr. 14, 1998 to Boulet, et al., all of which are incorporated herein by reference.

The semiconductor chips can be advantageously be implemented using chips known under the name ZISC (ZISC is a registered Trademark of the IBM Corporation). In the aforementioned ZISC chips, the ANNs are based on mapping an input space, in accordance to a well known Region of Influence (ROI) algorithm.

With reference to U.S. Pat. No. 5,710,869, the base ZISC chip architecture is depicted in FIGS. 4A and 4B. As apparent from the drawings, a plurality of neuron circuits referenced 11-1 to 11-n are fed in parallel by four buses labeled DATA-BUS, CAT-BUS, MaxIF/MinIF-BUS and NO/CXT-BUS which respectively transmit data, category information, maximum/minimum values of the field of influence and 'normal context' values. After being processed, the data is outputted to a common communication bus labeled COM*-BUS via OR gate 12. The detailed architecture of a neuron is shown in FIG. 5 of the above mentioned patent. During the recognition phase, the multi-norm distance evaluator circuit calculates the distance D between the input vector and the prototype stored therein. A 'distance compare circuit' compares D with the prototype actual influence field (AIF) to generate a first and second comparison signal. An identification circuit processes the comparison signals and the local category signal to generate signals that represent the neuron's response to the input vector. A minimum distance determination circuit establishes the minimum distance Dmin between the distances calculated by each neuron of the ANN. This circuit is also subsequently used to search and sort categories. For each neuron, a daisy chain circuit is serially connected to the daisy chain circuit of two adjacent neurons, thereby linking the neurons forming the ANN. The daisy chain circuit is essential in determining the state of the neuron, i.e., whether free or engaged. Finally, a context circuit enables (or inhibits) the neuron from participating alongside other neurons during the recognition phase by comparing the local context of each neuron to the global context.

During the learning phase, a 'write category operation' only engages the first free neuron of the ANN. As mentioned previously, the daisy chain circuit distinguishes between the two possible states of the neuron (engaged or free) and identifies the first free 'or ready to learn' neuron of the ANN, based on the respective values of its input and output signals. In the following description, a neuron will be considered as having three potential states (first free, free and engaged). The free neuron is the only neuron having these signals in a complementary state. The daisy chain circuit is described in detail in U.S. Pat. No. 5,710,869 with reference to FIGS. 5 and 31. In order to facilitate the understanding of the present invention, this drawing has been duplicated herein as FIG. 1 but with different numerals.

Referring to the aforementioned FIG. 1, the conventional daisy chain circuit now referenced 10 includes a 1-bit register 11 controlled by a store enable signal ST which is activated at initialization or at the end of the learning phase in which a new neuron is engaged. The 1-bit register 11 input is connected to the output of a 2-way AND gate 12 receiving signals DCI and RESET-. The output of 1-bit register 11 is connected to the input of a second 2-way OR gate 13 while the ALL signal is applied to the other input. The ALL signal enables all the daisy chain circuits of the ANN at initialization. DCO is the signal which is outputted from OR gate 13. Daisy chain circuit 10 further includes a control logic circuit 14 which consists of a 2-way XOR (exclusive OR) gate 15 and a 2-way AND gate 16. In XOR gate 15, DCI and DCO signals are compared to generate control signal RS (Ready to Store) that will be subsequently used as a gating signal for different circuits of each neuron to identify the first free or 'ready to learn' neuron in the ANN. On the other hand, AND gate 16 generates a CO signal from the DCO and NS signals. The NS signal is generated by the matching circuit of the neuron (referenced 150 in FIGS. 5 and 16 of U.S. Pat. No. 5,710,869).

At initialization, all the 1-bit registers are forced to '0' by signal RESET-. The DCI input of the daisy chain of the first neuron in the ANN is set to '1' so that this neuron is 'ready to learn' (i.e., the first free neuron).

During the learning phase, the 1-bit register 11 of this free neuron is set to '1' when the ST signal is activated, "engaging" this neuron (i.e., its output is at '1'). Once engaged, the next neuron in the ANN becomes the first free neuron. The signal RS, which is a combination of both DCI and DCO signals, enables the loading of the input vector components into the R/W (read/write) memory circuit (referenced 250 in FIG. 5 of U.S. Pat. No. 5,710,869). It also determines the category specified by the user into the category register, the global context value into the local context register and, finally, the minimum distance Dmin determined by the determination circuit (referenced 500 in FIGS. 5 and 8 of the aforementioned patent) which is stored in the AIF register as the AIF value of the first free neuron. At the end of the learning process, the DCI signal is latched into the 1-bit register 11 for each neuron to define which neuron is the first free neuron of the ANN.

During the recognition mode, only the neurons which are engaged and for which the local context matches the global context of all the engaged neurons (when the global context equals '0') participate in the recognition process. It is the role of the CO signal to select the distance evaluator circuit (referenced 200 in FIGS. 5 and 19 of U.S. Pat. No. 5,710, 869) and the minimum distance determination circuit of these neurons to make them operative.

Unfortunately, the daisy chain circuit in ZISC chips does not include an adequate on-chip testability capability which would easily allow to test the integrity of the neurons forming the ANN not only during the setup but also when an application is running, without complicating the existing software and negatively impacting the overall performance of the ANN.

OBJECTS AND SUMMARY OF THE PRESENT INVENTION

It is therefore a primary object of the present invention to provide a method and a circuit that perform an integrity diagnostic of all the neurons forming an artificial neural network based upon mapping the input space.

It is another object of the present invention to provide a method and a circuit that perform an integrity diagnostic of all the neurons forming an artificial neural network based upon mapping the input space which can simultaneously test all the neurons in real time.

It is another object of the present invention to provide a method and a circuit that perform an integrity diagnostic of all the neurons forming an artificial neural network based upon mapping the input space at the cost of only a few logic gates.

The accomplishments of these and other related objects are achieved by the method of the present invention. The diagnostic method engages simultaneously all the neurons of the ANN network of the same prototype.

In a first aspect of the invention, the method includes the steps of 'learning'all the neurons of the ANN of the same prototype (vector components, category, context and AIF). A first test vector having. e.g., the same context, is first loaded into the ANN. All the neurons compute their own distance with a first test vector (this distance should be the same if all the neurons were good). If at least one neuron fails, either the distance, the category, the context or the AIF value will be different from a corresponding expected value. The neuron giving at least one different answer can easily be isolated using the minimum distance determination circuit and flagged according to its particular context, i.e., a value identifying a fail. As long as this context is not selected by the global context, failing neurons do not contribute to the learning and recognition processes. The diagnostic method allows a fast integrity diagnostic of the neurons of an ANN based on mapping an input space. When implemented with ZISC chips, the diagnostic method also reveals itself to be inexpensive since it only requires a few additional logic gates.

BRIEF DESCRIPTION OF THE DRAWINGS

The novel features believed to be characteristic of this invention are set forth in the appended claims. The invention itself, however, as well as these and other objects, aspects and advantages thereof will be best understood by reference to the following detailed description of an illustrated preferred embodiment to be read in conjunction with the accompanying drawings.

DESCRIPTION OF A PREFERRED EMBODIMENT

Figure 2:
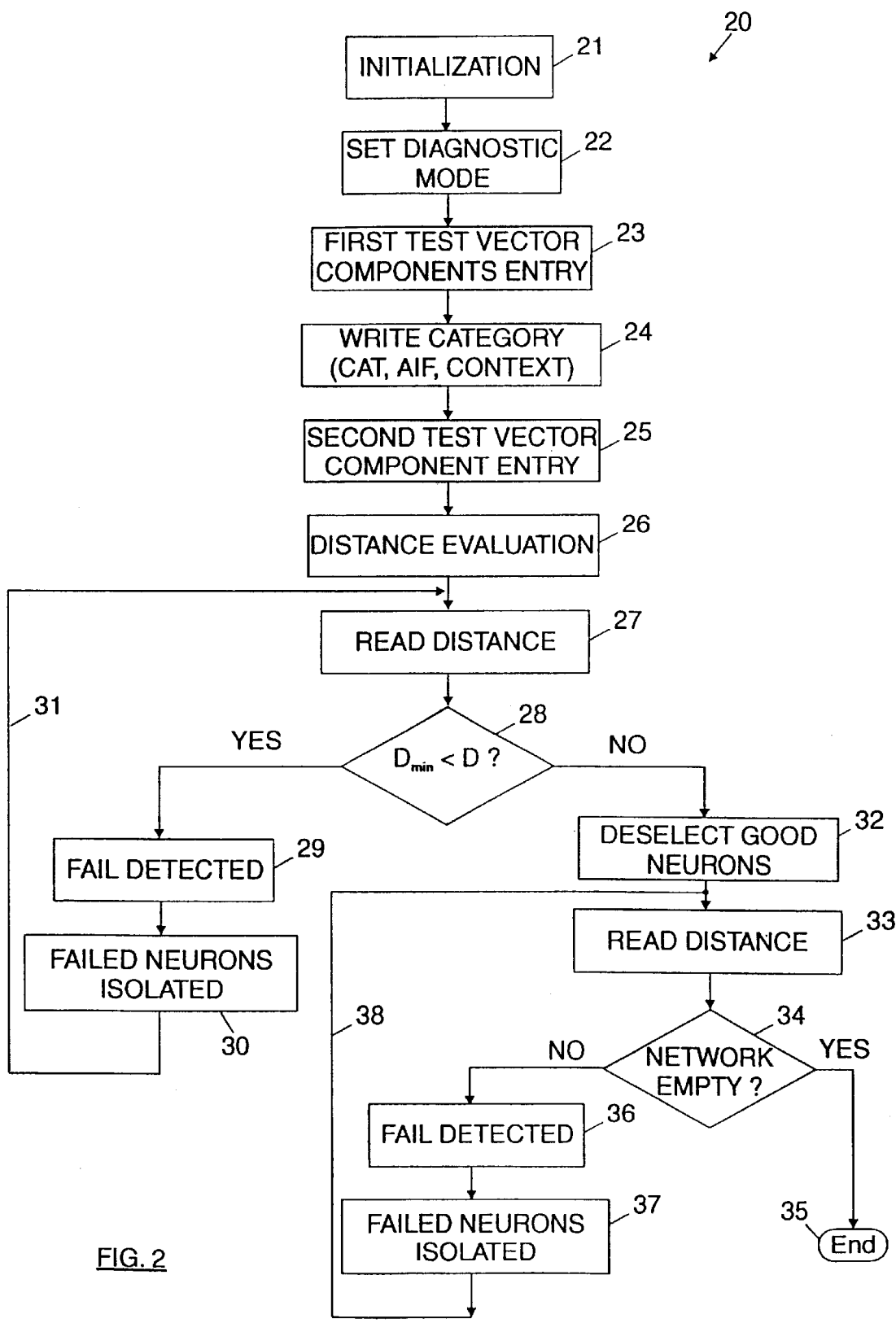
FIG. 2 is a flow chart showing the essential steps of the diagnostic method of the present invention to perform an integrity diagnostic of all the neurons forming the ANN based the mapping of the input space.

FIG. 2 shows the essential steps of the diagnostic method of the present invention. The intent purpose is to detect a different answer of one or more of the neurons forming the ANN under test when any type of hardware failure occurs in a neuron. Any difference will be detected by a few read distance operations.

Referring to FIG. 2 where a sequence of steps is schematically illustrated by flow chart 20, the first step consists in initializing the ANN (step 21), i.e., to perform a general reset of the daisy chain circuits. Then, the diagnostic mode is set (step 22), preferably by enabling a specified bit (DIAG bit) in the control register. The components of the first test vector are loaded in the R/W memory of each neuron of the ANN (step 23). The components are chosen by the user in order to exercise the full width of the distance evaluator and distance compare circuits, thereby exercising all the bits of the adders included therein. All neurons of the ANN are then engaged with the same learning, essentially the same category CAT, by a write category operation (step 24). [Note that if ZISC chips are used, the context and the AIF values are also loaded in their respective registers during this operation]. After this first write category operation, a second test vector is loaded into the ANN (step 25). Likewise, the components of this second test vector are chosen by the user in order to exercise the full width of the distance evaluator and distance compare circuits. The two test vectors may have the same or different components. If the two test vectors are the same, the minimum distance Dmin='0'. The second test vector is used for comparison purposes. To that end, each neuron of the ANN computes the distance between the two test vectors (step 26).

Now, a first Read distance operation is performed (step 27) to compute the minimum distance Dmin followed by a test which aims at determining whether the ANN contains failing neurons (step 28). Depending upon the integrity of the ANN and the type of fails, different cases have to be considered.

If Dmin is lower than the characteristic distance D of an ideal ANN (defined by the user as a result of computing the distance of the two test vectors selected), at least one failing neuron needs to be detected (step 29). The failing neuron(s) associated to this distance is (are) isolated from the ANN (step 30). When implemented with ZISC chips, this operation is performed by assigning a predetermined context value to the failing neurons. A new read distance operation (step 27 through loop 31), followed by the test that determines whether the ANN still contains failing neurons (step 28). As long as Dmin<D, the algorithm branches to the read distance operation (step 27). When the test performed in step 28 is negative, i.e., Dmin≧D, the process continues by deselecting the good neurons (step 32). This is applicable to the case wherein the ANN contains no failing neurons, highlighted by the computed distance being lower than D. A deselected neuron is defined as a neuron which is prevented from participating in any further Dmin computation. A new read distance operation is performed (step 33) followed by a test which determines whether the ANN is empty. By "empty" it is to be understood that there is no longer any neuron providing a distance on the communication bus (step 34) and the diagnostic process is terminated (step 35).

If Dmin is larger than the characteristic distance D, at least one failing neuron has been detected (step 36). The failing neuron(s) associated with this distance is (are) isolated (step 37) in the same manner described above and the algorithm is now ready for a new read distance operation (step 33) by way of loop 38. This sequence of steps is repeated until there is an indication that ANN is empty. The fact that the algorithm branches directly to END (step 35) indicates that the ANN is empty, i.e., that all the neurons of the ANN are labeled good. In contradistinction, if the algorithm branches either to loops 31 or 38, it highlights the existence of failing neurons.

Figure 1:
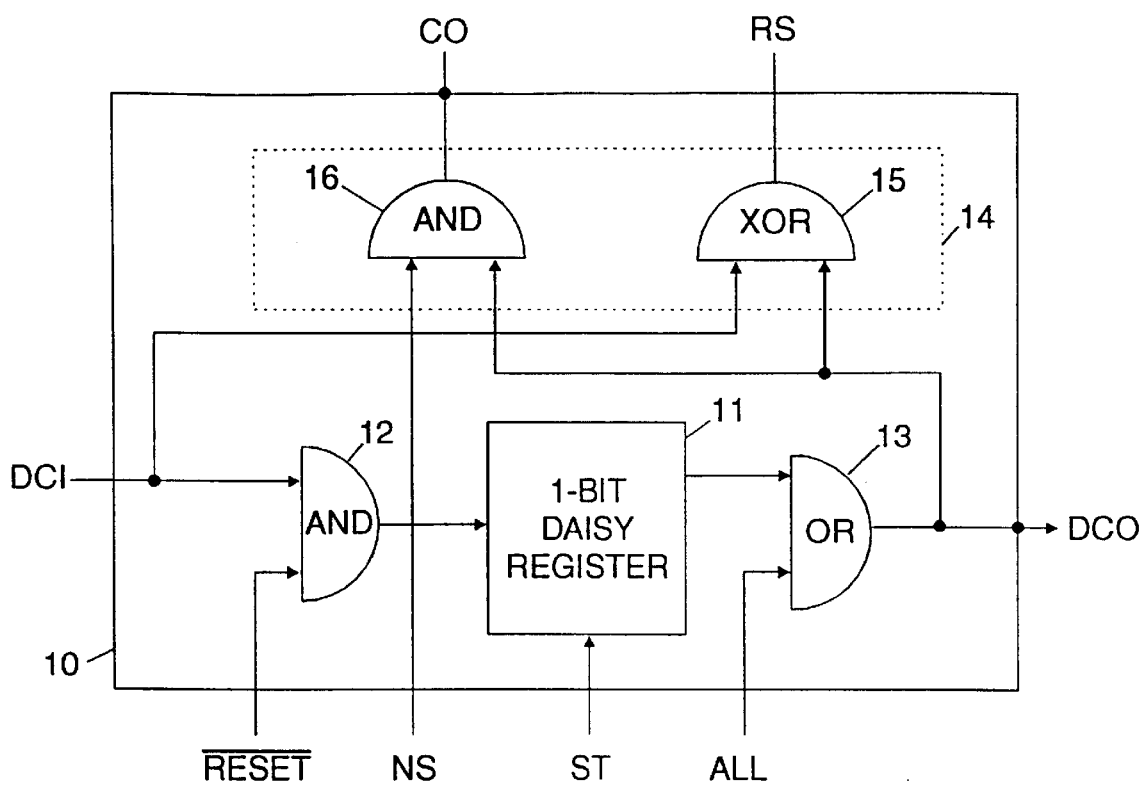
FIG. 1 is a schematic block diagram of a conventional daisy chain circuit that is used to differentiate the two different states of a neuron when implemented using ZISC chips.
Figure 3:
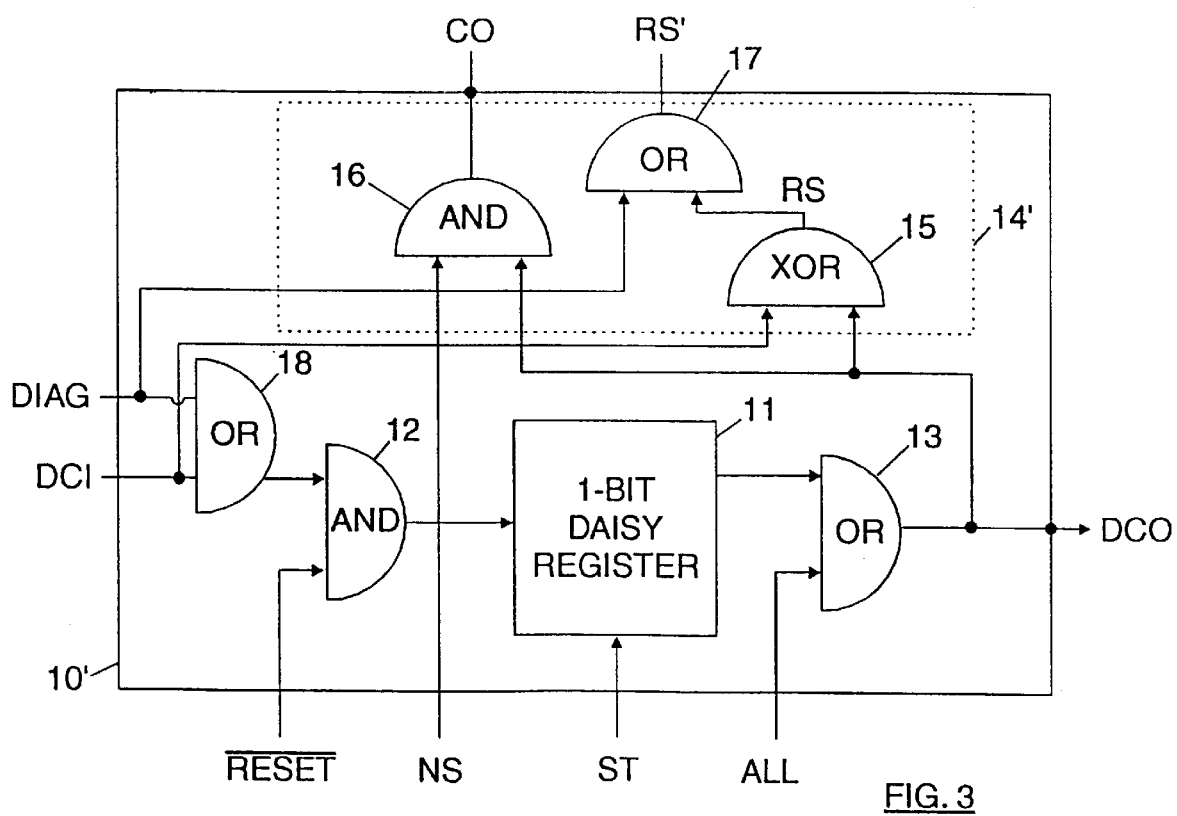
FIG. 3 shows an improved daisy chain circuit of FIG. 1, in accordance with the present invention.

FIG. 3 shows the daisy chain circuit of FIG. 1 modified according to the present invention for diagnostic purposes, wherein same elements bear the same references. With regards to the improved daisy chain circuit 10 of FIG. 1, the original circuit has been modified by incorporating two 2-way OR gates 17 and 18. The signal RS' (corresponding to previous signal RS) is obtained by OR-ing the DIAG signal with the RS signal outputted from XOR gate 15. This signal results from a comparison of the DCI and DCO signals of the daisy chain circuit in XOR gate 15. This RS' signal enables the loading of the components of the first test vector into the RAM of all the neurons of ANN, the category specified by the user into the category register, the global context value in the local (or neuron) context register as well as an predetermined AIF value in the AIF register.

Normal Operation (i.e., DIAG signal disabled: DIAG=0)

During the learning phase, i.e., when the write category operation only engages the first free neuron, the DIAG signal exerts no influence thereon. At the end of the learning process, the DCI and DIAG signals are OR-ed (gate 18) and the result is latched into the 1-bit register 11 of each neuron to define which neuron is next in becoming the first free neuron.

During the recognition phase, only neurons which are engaged, i.e., those for which the neuron context matches the global context or when the global context equals '0' participate in the process. The CO signal (which was not impacted by the redesign of circuit 10) enables both the distance evaluator and the minimum distance determination circuits, as was described with reference to circuit 10 of FIG. 1.

Diagnostic Operation (i.e., DIAG signal is enabled DIAG=1)

After initialization, immediately after that the DIAG signal switches to '1', all the neurons of ANN are set as first free neurons. As a result, it is now possible to engage simultaneously all the neurons of a same prototype (first test vector components, category, context and AIF) during the learning process. Referring to AIF, it is to be noted that the value of AIF is the same for all the neurons and is made equal to MaxIF. This is implemented by signal RS' which is set to '1' by way of OR gate 18 when DIAG=1. At the end of the learning process, all the neurons of ANN have been engaged as a result of signal RS' switching to '1'. During the recognition phase, all the neurons of ANN participate in the recognition process (CO=1). As a result, when the second test vector is presented to ANN, all the neurons compute their own distance between this vector and the prototypes (the same for all neurons) that were previously loaded during the learning phase.

The present method of diagnostic could also be used to perform a software reset of ANN. In this case, the following sequence would be adequate:
1. Set diagnostic bit (DIAG=1).
2. Set global context to '0'.
3. Write category '0'.
4. Reset diagnostic mode (DIAG=0).
5. Reset daisy chain circuits.

At the end of the above sequence, all the neurons of ANN are in a free state, and the first free neuron becomes the first neuron of ANN. The contents of all the local (neuron) category and context registers are equal to zero. The state of the network is equivalent to the state after hardware reset, without disturbing the initial results.

The diagnostic time T is independent of the number N of neurons in ANN. Without a diagnostic mode, the same test would have required a time equal to N×T. As a matter of fact, when the diagnostic bit is set in the control register, ANN is seen as formed by a single neuron duplicated N times, each computing the same value. If one value differs, the minimum circuit of the failing neuron does not output the expected characteristic distance D.

The present method provides a fast and inexpensive diagnostic of the integrity of ANN. The method can be implemented in a silicon chip at the cost of only a few logic gates and avoids having to rework bad chips on a module or card or card.

Practitioners in the art will fully recognize that the inventive method can be embodied in a program storage device readable by a machine, tangibly embodying a program of instructions executable by the machine to perform method steps for performing an integrity diagnostic of a plurality of neurons forming an artificial neural network (ANN) based upon mapping an input space defined by input vector components based on category, context, and actual field of influence of the neurons, the method having been previously described.

Whereas the invention has been described with reference to a preferred embodiment, (i.e., flow chart and circuit), those skilled in the art will readily recognize that changes and modifications to the flow chart and circuit are possible. It is not intended nor is desired to limit the invention to the exact construction and operation as illustrated and described. Hence, all suitable modifications and equivalents may be resorted to as falling within the scope of the invention.

What is claimed is:

1. A method for performing an integrity diagnostic of a plurality of neurons forming an artificial neural network (ANN) based upon a mapping of an input space defined by input vector components based on category, context, and actual field of influence of the neurons, the method comprising the steps of:

initializing the ANN and setting the ANN in a diagnostic mode;

loading the components of a first input vector into the neurons of the ANN, simultaneously engaging all the neurons of a same prototype by performing a write category operation;

loading the components of a second input vector into the neurons of the ANN, simultaneously computing a distance between the respective prototypes and the second input vector;

performing a read distance operation to obtain a minimum distance Dmin for each of the neurons, comparing the minimum distance Dmin with a distance D between the first and the second input vectors, and testing whether Dmin<D;

if Dmin<D, at least one failing neuron is known to exist, isolating the failing neuron and reinitiating the read distance and test operations;

if Dmin≧D, deselecting the good neurons of the ANN, thereby preventing the good neurons from participating in a further read distance operation;

performing a read distance operation on the remaining neurons; and testing if the ANN is empty:

if the ANN is empty, terminated the diagnostic sequence;

if the ANN is not empty, at least one failing neuron exists, isolating the failing neuron and restarting the read distance and test operations until the ANN is empty.

2. The method of claim 1 wherein the components of the first input vector are loaded in a read and write (R/W) memory of each neuron of the ANN.

3. The method of claim 1 wherein the components of the first input vector are selected by a user to exercise the full width of all registers associated with each of the neurons.

4. In each neuron of an artificial neural network (ANN) consisting of a plurality of neurons organized as a chain, an improved daisy chain circuit comprising:

an input terminal for receiving an input signal (DCI) generated by the daisy chain circuit of a previous neuron; and a daisy chain element constructed around a register which stores the input signal (DCI), the register being controlled by a store enable signal (ST) which is active during a learning phase of the ANN, and further comprising an output signal (DCO) for driving the input terminal of the daisy chain circuit of a subsequent neuron in the chain, wherein logic values of the input and the output signals indicate a state of the neuron; and a means for generating a first control signal (RS) to identify a first free neuron of the ANN to be engaged during the learning phase, the improvement characterized in that:

a first logic means activates the input signal (DCI) during the learning phase when a diagnostic signal (DIAG) is activated; and a second logic means activates the first control signal when the diagnostic signal is activated, generating a second control signal (RS') to engage simultaneously every neuron of the ANN having the same prototype.

5. The improved daisy chain circuit of claim 4, wherein the neuron state is free, first free or engaged.

6. In each neuron of an artificial neural network (ANN), consisting of a plurality of neurons organized as a daisy chain, an improved daisy chain circuit comprising:

a first input terminal for receiving an input signal (DCI) generated by the daisy chain circuit of a previous neuron;

a second input terminal for receiving a diagnostic signal (DIAG), enabling a diagnostic mode;

a register means for storing the input signal generated by a first control signal (ST) which is activated during a learning phase of the ANN, and for generating an output signal (DCO) wherein the input and output signals indicate a state of the neuron;

a logic means for comparing the input and output signals DCI and DCO and generating the first control signal (RS) that identifies the first free neuron of the ANN to be engaged during the learning phase; and a logic means for forcing the first control signal to generate a second control signal (RS') which is active when a diagnostic signal indicates that the neuron is in the first free state.

7. A program storage device readable by a machine, tangibly embodying a program of instructions executable by the machine to perform method steps for performing an integrity diagnostic of a plurality of neurons forming an artificial neural network (ANN) based upon mapping an input space defined by input vector components based on category, context, and actual field of influence of the neurons, the method steps comprising:

a) loading the components of first and second input vectors into the ANN;

b) engaging all the neurons of a same prototype;

c) for each of the neurons, computing a distance between the respective prototypes and the second input vector;

d) determining a minimum distance Dmin and comparing the minimum distance Dmin with a distance D measured between the first and the second input vectors, testing whether Dmin<D;

if Dmin<D, at least one failing neuron is known to exist, thereby isolating the failing neuron;

if Dmin≧D, deselecting the good neurons of the ANN, preventing the good neurons from further processing; and e) repeating steps a) through d) until the ANN is empty.

* * * * *